Patented May 1, 1951

2,550,847

UNITED STATES PATENT OFFICE 2,550,847

PROPYLENE OXIDE PURIFICATION PROCESS

Robert L. Mitchell and William T. McNair, Jr., Corpus Christi, Tex., assignors to Celanese Corporation of America, New York, N. Y., a corporation of Delaware No Drawing. Application March 1, 1950, Serial No. 147,154

6 Claims. (Cl. 260—348)

This invention relates to a purification process for the production of purified 1,2-propylene oxide from crude mixtures of organic compounds containing 1,2-propylene oxide.

An object of this invention is the provision of an improved process for the separation of purified 1,2-propylene oxide from a crude mixture of organic compounds comprising essentially 1,2-propylene oxide and containing acetaldehyde, methyl formate, methylal, ethylene oxide and methanol as impurities.

Other objects of this invention will appear from the following detailed description.

The vapor phase, partial oxidation of aliphatic hydrocarbons such as propane or butane, or mixtures thereof, employing air or oxygen as the oxidizing agent, results in the production of a complex mixture of products including formaldehyde, acetaldehyde, methanol, propionaldehyde, allyl alcohol, isopropyl alcohol, n-propyl alcohol, isobutanol, secondary butanol, n-butanol, acetone, methyl ethyl ketone, methylal, acrolein, tetrahydrofuran, methyl formate and other esters, formals, acetals and various oxides, as well as numerous other aliphatic compounds, in varying amounts. In order to separate the complex mixture of oxidation products and to purify each of the components so that they will be suitable for commercial use, an intricate products purification scheme is necessary. The purification involves a series of operations yielding a number of crude fractions each containing a plurality of compounds. One such fraction obtained is a mixture comprising essentially 1,2-propylene oxide and containing acetaldehyde, methyl formate, methylal, ethylene oxide and methanol as impurities. The separation of 1,2-propylene oxide from this crude mixture by straight distillation methods is not a practical, commercial step because the relative volatility of the 1,2-propylene oxide and the methyl formate present in the crude mixture is near unity. Accordingly, the separation of 1,2-propylene oxide from the mixture in highly purified form is not possible by ordinary fractional distillation.

We have now found that methyl formate may be removed substantially completely from a crude mixture of 1,2-propylene oxide containing methyl formate, acetaldehyde, methylal, ethylene oxide and methanol as impurities if said crude mixture is strongly agitated with an aqueous solution of an alkaline saponifying agent whereby the methyl formate present is saponified, the resulting reaction mixture allowed to separate into an upper organic layer and a lower aqueous layer, and the layers then separated. The upper organic layer comprises essentially 1,2-propylene oxide while the lower aqueous layer comprises an aqueous solution of the unreacted alkaline saponifying agent and alkali formate formed as a product of the saponification reaction. The layers may be separated in any convenient manner and recoveries of 1,2-propylene oxide of over 90% and in a purity of 78 to 82% may be readily obtained. The purity of the 1,2-propylene oxide may be increased to 95 to 99% by a fractional distillation.

In carrying out our novel process, we preferably employ a slight stoichiometric excess of alkaline saponifying agent. An excess of alkaline saponifying agent of 3 to 20% by weight over that normally required to effect complete saponification of the methyl formate present is satisfactory. As examples of alkaline saponifying agents which we may employ, there may be mentioned sodium hydroxide, or potassium hydroxide. Preferably, the alkaline saponifying agent is employed in the form of a 15 to 25%, say 20%, by weight aqueous solution.

The strong agitation necessary to effect the desired saponification reaction may be achieved in any convenient manner and high speed multiblade propeller mixers have been found to be suitable. Optimum results are obtained, however, when mixing is effected with the aid of a centrifugal pump. The crude 1,2-propylene oxide and aqueous saponifying agent are suitably proportioned by means of flow meters as they are brought together so that the desired excess of saponifying agent is thus ensured and the mixture introduced into the mixing means employed. Mixing is so effected that the solutions are subjected to the strong agitation necessary for complete or substantially complete saponification for a period of about 20 to 75 seconds. Thus, our process may be carried out continuously by introducing the crude 1,2-propylene oxide and aqueous saponifying solution in suitable proportion into the mixer employed and continuously removing the reaction mixture formed from the mixer after the desired saponification reaction is completed. When employing a centrifugal pump as the mixing means, the two solutions are fed to the pump in the desired proportion and, by placing the necessary back pressure on the discharge side of the pump, the solutions being mixed may be maintained therein for the desired reaction period.

The exothermic reaction which takes place when the aqueous solution of saponifying agent is strongly agitated with the crude 1,2-propylene oxide containing the several impurities mentioned causes a rise in the temperature of the reaction mixture. The crude 1,2-propylene oxide and aqueous saponifying agent are usually mixed with each at a temperature of 70 to 100° F. When the exothermic rise in temperature has taken place due to the saponification reaction which occurs, as well as the resinification of the aldehydes, the temperature of the final reaction mixture rises to about 120 to 160° F. The mixture is discharged into a suitable vessel where it separates into layers, the upper layer comprising essentially 1,2-propylene oxide free of methyl formate and the lower aqueous layer containing the alkali formate and any unreacted alkaline saponifying agent. The resinified aldehydes present are solids which settle at the interface of the two layers. The aqueous layer and resinified aldehydes may be readily separated from the organic layer.

Our process enables 1,2-propylene oxide to be obtained in a highly purified form substantially free of methyl formate, i. e. containing less than 0.02% of methyl formate by weight.

In order further to illustrate our invention, but without being limited thereto, the following examples are given:

*Example I*

A crude solution of 1,2-propylene oxide containing, by analysis, 83.16% by weight of 1,2-propylene oxide, 0.69% of acetaldehyde, 9.71% of methyl formate, 0.26% of ethylene oxide, 4.12% of methylal and 2.02% of methanol is continuously mixed with an aqueous 20% by weight solution of sodium hydroxide in such proportion that a 3% stoichiometric excess of sodium hydroxide is present in the mixture over that necessary to saponify the methyl formate. The mixture is formed at a temperature of 78° F. and is then passed through a centrifugal pump at such a rate that each portion of the solution remains therein subject to the resulting strong agitation for about 42 seconds. The reaction mixture thus formed leaves the pump at a temperature of 131° F. and is then passed to a decanter where it separates into two layers. The upper layer consists of 1,2-propylene oxide containing 0.028% by weight of methyl formate while the lower layer comprises an aqueous solution of unreacted sodium hydroxide, and sodium formate. No 1,2-propylene oxide is present in the aqueous layer. The organic layer may be readily decanted from the aqueous layer. The 1,2-propylene oxide thus recovered is 93.2% of that introduced into the system and is obtained in a purity of about 80.5%.

*Example II*

Crude 1,2-propylene oxide of the composition set forth in Example I is continuously mixed with an aqueous 20% by weight solution of sodium hydroxide in such proportion that a 17% stoichiometric excess of sodium hydroxide is present in the resulting mixture over that necessary to saponify the methyl formate present. The mixture is formed at a temperature of 79° F. and is then passed to a centrifugal pump at such a rate and with sufficient back pressure that each portion of the solution remains therein under strong agitation for 50 seconds. The reaction mixture formed is discharged at a temperature of 134° F. to a decanter where it separates into two layers, the upper layer comprising 1,2-propylene oxide containing 0.008% by weight of methyl formate and the lower layer comprising an aqueous solution of the water-soluble materials. The two layers are then separated. The 1,2-propylene oxide is recovered in an amount equal to 91.5% of that introduced into the system and in a purity of about 79.5%.

It is to be understood that the foregoing detailed description is given merely by way of illustration and that many variations may be made therein without departing from the spirit of our invention.

Having described our invention, what we desire to secure by Letters Patent is:

1. In a process for the separation of 1,2-propylene oxide from a crude mixture of 1,2-propylene oxide containing methyl formate as an impurity, the step which comprises subjecting the crude 1,2-propylene oxide to strong agitation in admixture with an aqueous solution of an alkaline saponifying agent, and then separating the resulting reaction mixture into layers, one layer comprising an aqueous solution of the water-soluble components and the other comprising 1,2-propylene oxide essentially free of methyl formate.

2. In a process for the separation of 1,2-propylene oxide from a crude mixture of 1,2-propylene oxide containing methyl formate as an impurity, the step which comprises subjecting the crude 1,2-propylene oxide to strong agitation in admixture with an aqueous solution of an alkaline saponifying agent in an amount sufficient to provide a stoichiometric excess of saponifying agent over that necessary to saponify the methyl formate present, and then separating the resulting reaction mixture into layers, one layer comprising an aqueous solution of the water-soluble components and the other comprising 1,2-propylene oxide essentially free of methyl formate.

3. In a process for the separation of 1,2-propylene oxide from a crude mixture of 1,2-propylene oxide containing methyl formate as an impurity, the step which comprises subjecting the crude 1,2-propylene oxide to strong agitation in admixture with an aqueous solution of an alkaline saponifying agent in an amount sufficient to provide a 3 to 20% by weight stoichiometric excess of saponifying agent over that necessary to saponify the methyl formate present, and then separating the resulting reaction mixture into layers, one layer comprising an aqueous solution of the water-soluble components and the other comprising 1,2-propylene oxide essentially free of methyl formate.

4. In a process for the separation of 1,2-propylene oxide from a crude mixture of 1,2-propylene oxide containing methyl formate as an impurity, the step which comprises subjecting the crude 1,2-propylene oxide to strong agitation in admixture with an aqueous solution of sodium hydroxide in an amount sufficient to provide a stoichiometric excess of sodium hydroxide over that necessary to saponify the methyl formate present, and then separating the resulting reaction mixture into layers, one layer comprising an aqueous solution of the water-soluble components and the other comprising 1,2-propylene oxide essentially free of methyl formate.

5. In a process for the separation of 1,2-propylene oxide from a crude mixture of 1,2-propylene oxide containing methyl formate as an impurity, the step which comprises subjecting the crude 1,2-propylene oxide to strong agitation in admixture with an aqueous solution of sodium hydroxide in an amount sufficient to provide a 3 to 20% by weight stoichiometric excess of sodium hydroxide over that necessary to saponify the methyl formate present, and then separating the resulting reaction mixture into layers, one layer comprising an aqueous solution of the water-soluble components and the other comprising 1,2-propylene oxide essentially free of methyl formate.

6. In a process for the separation of 1,2-propylene oxide from a crude mixture of 1,2-propylene oxide containing methyl formate as an impurity, the step which comprises subjecting the crude 1,2-propylene oxide to strong agitation in admixture with an aqueous solution of sodium hydroxide in an amount sufficient to provide a 3 to 20% by weight stoichiometric excess of sodium hydroxide over that necessary to saponify the methyl formate present, maintaining the crude 1,2-propylene oxide solution in contact with said aqueous sodium hydroxide under said strong agitation for 20 to 75 seconds, and then separating the resulting reaction mixture into layers, one layer comprising an aqueous solution of the water-soluble components and the other comprising 1,2-propylene oxide essentially free of methyl formate.

ROBERT L. MITCHELL.
WILLIAM T. McNAIR, Jr.

No references cited.